United States Patent
Schiemenz

(10) Patent No.: US 11,787,423 B2
(45) Date of Patent: Oct. 17, 2023

(54) METHOD FOR CARRYING OUT A SELF-DIAGNOSIS IN AN AUTOMATED VEHICLE

(71) Applicant: VOLKSWAGEN AKTIENGESELLSCHAFT, Wolfsburg (DE)

(72) Inventor: Richard Ludwig Schiemenz, Isenbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/956,197

(22) PCT Filed: Dec. 19, 2018

(86) PCT No.: PCT/EP2018/085978
§ 371 (c)(1),
(2) Date: Jun. 19, 2020

(87) PCT Pub. No.: WO2019/122007
PCT Pub. Date: Jun. 27, 2019

(65) Prior Publication Data
US 2020/0331482 A1    Oct. 22, 2020

(30) Foreign Application Priority Data
Dec. 19, 2017 (DE) .............. 10 2017 130 549.1

(51) Int. Cl.
*B60W 50/02* (2012.01)
*B60W 50/035* (2012.01)
*B60W 50/08* (2020.01)

(52) U.S. Cl.
CPC ...... *B60W 50/0205* (2013.01); *B60W 50/035* (2013.01); *B60W 50/082* (2013.01)

(58) Field of Classification Search
USPC ........................................... 701/32
See application file for complete search history.

(56) References Cited

U.S. PATENT DOCUMENTS

| | | | |
|---|---|---|---|
| 9,805,522 B2 | 10/2017 | Schnurr et al. | |
| 10,086,782 B1* | 10/2018 | Konrardy | B60W 40/04 |

(Continued)

FOREIGN PATENT DOCUMENTS

| | | |
|---|---|---|
| CN | 104379428 A | 2/2015 |
| DE | 10 2009 018 152 A1 | 11/2009 |

(Continued)

OTHER PUBLICATIONS

International Search Report of PCT Application No. PCT/EP2018/085978, dated Apr. 10, 2019.

(Continued)

*Primary Examiner* — Jeff A Burke
*Assistant Examiner* — Jerrod Irvin Davis
(74) *Attorney, Agent, or Firm* — PEARL COHEN ZEDEK LATZER BARATZ LLP

(57) ABSTRACT

The invention relates to a method (100) for carrying out a self-diagnosis (115) of an automated vehicle (1), wherein the following steps are carried out:—operating the vehicle (1) in a standard operating mode (I) for a transport-oriented operation of the vehicle (1), in which the self-diagnosis (115) is automatically carried out according to a first weighting, and—operating the vehicle (1) in a diagnosis operating mode (II), in which the self-diagnosis (115) is automatically carried out using a second weighting, said second weighting being greater than the first weighting.

12 Claims, 3 Drawing Sheets

(56) References Cited

U.S. PATENT DOCUMENTS

| | | | |
|---|---|---|---|
| 2007/0027592 A1* | 2/2007 | Tolkacz | B60R 25/1004 |
| | | | 701/29.6 |
| 2009/0271064 A1 | 10/2009 | Enomoto et al. | |
| 2009/0281689 A1 | 11/2009 | Suganuma et al. | |
| 2009/0299561 A1* | 12/2009 | Matsumoto | B60K 6/28 |
| | | | 903/903 |
| 2012/0203411 A1 | 8/2012 | Mallebrein et al. | |
| 2014/0027089 A1* | 1/2014 | Hisada | B60L 15/20 |
| | | | 165/11.1 |
| 2014/0316682 A1* | 10/2014 | Whitney | F02D 11/105 |
| | | | 701/108 |
| 2015/0274062 A1* | 10/2015 | Wen | G07C 5/0841 |
| | | | 348/77 |
| 2017/0132118 A1 | 5/2017 | Stefan et al. | |
| 2017/0282817 A1 | 10/2017 | Yuichi et al. | |
| 2018/0046182 A1* | 2/2018 | Joyce | B60W 50/0225 |
| 2018/0050704 A1* | 2/2018 | Tascione | B60W 10/04 |
| 2018/0354353 A1* | 12/2018 | Dudar | G07C 5/0825 |
| 2019/0039627 A1* | 2/2019 | Yamamoto | B60W 50/14 |
| 2019/0156599 A1* | 5/2019 | Jammoussi | B60W 30/02 |

FOREIGN PATENT DOCUMENTS

| | | | |
|---|---|---|---|
| DE | 10 2009 020 854 A1 | 12/2009 | |
| DE | 10 2009 028 374 A1 | 2/2011 | |
| DE | 10 2015 002 913 A1 | 9/2016 | |
| DE | 102015002913 A1 * | 9/2016 | ........... G07C 5/0808 |
| DE | 10 2016 109 651 A1 | 12/2016 | |
| DE | 10 2015 221 814 A1 | 5/2017 | |
| DE | 10 2016 220 670 A1 | 5/2017 | |
| DE | 10 2015 225 152 A1 | 6/2017 | |
| KR | 20120134333 A | 12/2012 | |
| WO | WO 2006133865 A | 12/2006 | |
| WO | WO-2017207311 A1 * | 12/2017 | ........ B60W 50/0097 |

OTHER PUBLICATIONS

Search Report for German Patent Application No. 10 2017 130 549.1, dated Sep. 11, 2018.

Official Action for Chinese Patent Application No. 201880081810.0, dated Sep. 23, 2022.

\* cited by examiner

METHOD FOR CARRYING OUT A SELF-DIAGNOSIS IN AN AUTOMATED VEHICLE

CROSS-REFERENCE TO RELATED APPLICATIONS

This application is a National Phase Application of PCT International Application No. PCT/EP2018/085978, International Filing Date Dec. 19, 2018, claiming priority of German Patent Application No. 10 2017 130 549.1, filed Dec. 19, 2017, which is hereby incorporated by reference.

FIELD OF THE INVENTION

The present invention relates to a method for carrying out a self-diagnosis in an automated vehicle. Furthermore, the invention relates to an automated vehicle.

From the prior art, vehicles are known in which diagnostic procedures are carried out in order to detect fault states. In order to collect targeted diagnostic data, it is necessary for the vehicle to be driven under certain boundary conditions. However, it is often a problem that the influence on the boundary conditions is only limited. Furthermore, the implementation of such a diagnostic procedure is often time-consuming and technically complex.

DE 10 2016 220 670 A1 discloses a method and a system for testing software for automated vehicles.

DE 10 2016 109 651 A1 relates to a method for the validation of at least one vehicle function of a virtual automated vehicle.

The object of the present invention is to at least partially eliminate the disadvantages described above. In particular, the object is to enable a diagnosis to be carried out in a vehicle more reliably and/or with reduced restrictions for the normal operation.

SUMMARY OF THE INVENTION

The above object is achieved by a method having the features of an independent claim and by an automated vehicle having the features of an independent claim. Further features and details of the invention are described in the dependent claims, the description and the drawings. Features and details which are described in conjunction with the method according to the invention are of course also applicable in conjunction with the automated vehicle according to the invention, and vice versa, so that, with regard to the disclosure of the individual aspects of the invention, reference is or may be made always with mutual effect.

The object is achieved in particular by a method for carrying out a self-diagnosis of an automated vehicle. Self-diagnosis is understood here to mean, advantageously, the performance of at least part of a complete diagnostic method for the diagnosis of faults in the vehicle, wherein "self-" refers in particular to the fact that the vehicle itself at least partially carries out the measures necessary for the diagnosis, such as measurements, or carries out the diagnosis completely by itself. Self-diagnosis may include, for example, the determination of measured values at the vehicle (and by the vehicle), these then being evaluated externally of the vehicle in order to conclude the complete diagnosis. It may also be possible for the vehicle to carry out the evaluation itself.

It is provided here that the following steps are carried out, preferably one after the other or in any order, wherein individual steps may also be carried out repeatedly:

operating the vehicle in a standard operating mode for a transport-oriented operation of the vehicle, in which the self-diagnosis is automatically carried out according to a first weighting, in particular completely, operating the vehicle in a diagnosis operating mode, in which the self-diagnosis is automatically carried out using a second weighting, in particular completely, said second weighting being greater than the first weighting.

The use of an operating mode especially for vehicle diagnosis has the advantage that, in the standard operating mode, without serious limitation of the vehicle's operational capability, self-diagnosis may only be carried out as a secondary function, whereas only in exceptional cases may self-diagnosis be carried out with high priority and therefore more reliably, in the diagnosis operating mode, for example in the run-up to a workshop inspection or the like. The weighting is thus advantageously based on a priority and/or on a scope of the self-diagnosis and/or on an authorization which the self-diagnosis has with regard to the influencing of the operation of the vehicle. For example, the first weighting may also cause the self-diagnosis to be completely omitted, and the second weighting, on the other hand, may assign the highest priority to the self-diagnosis, for example for immediate execution of the self-diagnosis. It is also conceivable that there may be gradations in the weighting that lie between these two extremes. The first weighting may differ from the second weighting in such a way that in the standard operating mode, transport-oriented operation has priority and/or is not restricted, and in the diagnosis operating mode, transport-oriented operation may only be performed in such a way that self-diagnosis is possible.

It is further advantageous in the method according to the invention if the transport-oriented operation designates an operation of the vehicle in which the vehicle (in particular automatedly, i.e. driving independently without active control and/or driving by a driver) transports at least one occupant and/or at least one load. In particular, transport-oriented operation includes the determination of a route, i.e. a path between a starting point and a destination for route guidance. This may be determined, for example, by a navigation system of the vehicle, optionally depending on the current operating mode.

The self-diagnosis may include at least one system check to detect and/or analyze the state of the vehicle (in detail). From this information it is possible to deduce, for example, whether it will be necessary to replace individual vehicle components in the foreseeable future due to wear and tear. An advantage of the diagnosis operating mode may be that (similarly to regular maintenance or inspection), inspection work may be outsourced from the workshop to the vehicle, which may reduce the amount of work to be performed by staff in the workshop. In the case of a non-specific defect, the diagnosis operating mode (as a self-diagnosis mode) allows the automated collection of measurement data, which makes it easier for the workshop to draw conclusions about the cause of the fault. The collection of measurement data may be comparable to a corresponding collection of measured values collated during test drives, as is usually carried out for vehicles. The findings derived from the self-diagnosis (for example an imminent need for repair) advantageously make it possible to plan workshop capacities, spare parts procurement, and the like more efficiently. This may also increase the availability of the vehicle for transport purposes.

An automated vehicle is understood to be a (real) self-propelled vehicle, preferably a motor vehicle, in particular a trackless land vehicle, for example a passenger car and/or a truck. This vehicle may (at least partially and/or temporarily) drive, steer and/or park without the influence of a human driver. Accordingly, the vehicle may also be designed without a steering wheel, brake pedal and/or accelerator pedal. Furthermore, in embodiments of automated vehicles, it is provided that the vehicle is controlled from outside the vehicle, for example by means of an external data processing system and/or by radio. This control also includes, for example, the adjustment of driving behavior and/or route determination for navigation. It is possible that a transport-oriented operation of the vehicle is used to transport at least one occupant and/or a load. The route determination and/or the driving behavior may be influenced by at least one occupant, i.e. the user of the vehicle. Thus, in the standard operating mode, it may be possible for the user to specify a specific destination for the route determination, or to specify that certain route criteria (for example exclusion of freeways, choice between the shortest or the fastest route, setting of a speed limit, or the like) are used for the driving behavior. It may be possible that these route criteria are determined by the self-diagnosis in the diagnosis operating mode.

It may be provided in the method according to the invention that, in order to carry out the self-diagnosis, it is assumed that at least one release condition is met. The release condition comprises, for example, at least one specification for at least one input parameter. Examples of some variants for release conditions are as follows:

a temperature of the vehicle, for example a cooling water temperature, must fall below a certain limit value,
a certain time period of a stopping time of the vehicle must be observed or exceeded,
a certain operating time of the vehicle must be exceeded,
at least one predetermined route criterion must be met,
there must be an empty journey and/or a non-use for a transport journey of the vehicle,
an environmental condition must be met (for example an outdoor temperature must be above or below a certain limit value, or a certain weather criterion must be met).

Accordingly, the input parameter may be a temperature of the vehicle and/or a time duration of the stopping time and/or a duration of operation (for example since the vehicle was first put into operation) and/or a route criterion and/or an environmental parameter of the vehicle, such as an outside temperature, and/or the like.

Furthermore, in accordance with an advantageous development of the method according to the invention, it may be provided that, in the standard operating mode as transport-oriented operation of the automated vehicle, the fulfilment of the at least one release condition receives a low weighting, i.e. is not or is only passively taken into account for the operation of the vehicle. In this case, the operation of the vehicle may be carried out at least predominantly or exclusively on the basis of a user (occupant) request, which, for example, specifies the route criteria. If, for example, a route determined in this way also contains route sections for which at least one release condition required for self-diagnosis is met, self-diagnosis may still be carried out in the standard operating mode (otherwise not). It is also advantageous if the driving behavior in the standard operating mode is not actively adjusted for self-diagnosis purposes.

On the other hand, in the diagnosis operating mode, the operation of the vehicle may be adapted with high weighting (that is to say in particular actively) for the self-diagnosis, so that the fulfilment (and possibly even the active bringing about of the fulfilment) of the at least one release condition receives a high weighting. The different weighting refers to the extent to which the release condition is taken into account for the operation of the vehicle. Thus, the release condition may dominate the route determination in the diagnosis operating mode. For example, the destination and travel time may be of secondary importance and/or the route may be compiled exclusively for self-diagnosis. The driving behavior may also be of primary importance for fulfilling the release condition and/or for carrying out the self-diagnosis if the external boundary conditions, such as the traffic situation and/or road conditions and/or traffic guidelines, allow this. The self-diagnosis may thus include operation of the vehicle in public road traffic and thus under real conditions.

Furthermore, the different weighting may also include the fact that a weighting of input variables for the route calculation and for the driving behavior is different in the standard operating mode and in the diagnosis operating mode. For example, during a transport-oriented journey the driving behavior may only be adjusted in part in favor of self-diagnosis, and/or in the diagnosis operating mode the driving behavior may be completely adjusted in favor of self-diagnosis.

It may be provided in embodiments of the invention that the self-diagnosis is only carried out when a predetermined system state of the vehicle is present, and preferably the vehicle is operated in the standard operating mode such that the presence of the predetermined system state is passively monitored in order to initiate the self-diagnosis, and preferably the vehicle is operated in the diagnosis operating mode such that the predetermined system state is actively brought about to initiate the self-diagnosis. For active initiation, for example, a route adapted for the self-diagnosis may be determined for vehicle navigation and/or driven automatedly and/or a vehicle standstill of defined duration may be effected, and for passive monitoring, if appropriate, a calculated route may be checked for suitability for the self-diagnosis and/or an existing vehicle standstill may be checked with regard to the duration (stopping duration) necessary for self-diagnosis, for example may be checked by the vehicle electronics. The predefined system state is defined, for example, by a specification for at least one release condition. For example, a combination of certain release conditions must be present in order for the self-diagnosis to be carried out. It is thus ensured that the data determined is specific to a vehicle state to be examined.

In a group of embodiments it is provided that the vehicle has a navigation system for determining a route, the route being determined in the standard operating mode at least predominantly on the basis of an occupant request and in the diagnosis operating mode at least predominantly on the basis of at least one release condition for the self-diagnosis, the self-diagnosis preferably always being performed in the diagnosis operating mode and only being performed in the standard operating mode if the release condition is present. The occupant's request may be communicated to the vehicle, for example, by means of an input device, such as a touchscreen or voice input or the like. It may also be possible for the diagnosis operating mode to be activated only if the vehicle detects the absence of occupants and/or a load. In this case there is no transport, so the self-diagnosis is not able to affect normal operation.

It is possible that in the standard operating mode the automatedly driving vehicle carries out its route guidance, i.e. the determination and/or adjustment of the route, depending on input parameters such as destination, traffic situation, energy efficiency and/or driving time. One objective of a route calculation for determining and/or adapting the route may be to find a temporal and/or energetic optimum. In accordance with the invention, it may be possible that at least one release condition (release boundary condition) for the self-diagnosis with variable weighting is included in route guidance. The self-diagnosis is, for example, configured as a non-continuous diagnostic method, and therefore the execution may depend on the weighting. Preferably, the route guidance may include a calculation of a route profile and/or the calculation of the driving behavior. In other words, the release condition with different weighting for the standard operating mode and the diagnosis operating mode may be taken into account when operating the vehicle, preferably for determining the driving behavior and/or determining and/or adapting the route. With regard to the weighting, for example, it is possible that with the highest weighting (for example in the diagnosis operating mode) the release condition is brought about actively, and with the lowest weighting (for example in the standard operating mode) it is only possible to wait passively for the release condition to be present. It is also optionally provided here that intermediate levels are also provided between these two extreme weightings, at which levels the release condition is only partially influenced, for example.

It may be provided further advantageously that the self-diagnosis is carried out at least as a function of a release condition for a driving behavior, the vehicle preferably adapting the driving behavior to the self-diagnosis actively in the diagnosis operating mode, and preferably in a manner controlled within the vehicle. The driving behavior may, for example, comprise specifications for the selection of routes and/or the adaptation of speed and/or the like. Furthermore, it is particularly advantageous for certain diagnoses that the driving behavior is also adapted depending on the self-diagnosis, i.e. a certain driving behavior is specified for successful execution of the self-diagnosis. This may be related to the fact that, during the self-diagnosis, measured values are detected which are specific to the particular driving behavior and for which, for example, comparison values are available. If the measured values do not match the comparison values (within a tolerance), although the specific driving behavior was set, a fault in the vehicle may be concluded.

In addition, in embodiments of the invention, it may be advantageous that a switch from the standard operating mode to the diagnosis operating mode is actively initiated from outside the vehicle. This switchover, for example, may take place before a planned workshop visit in order to already run through diagnoses and routines for self-diagnosis of the vehicle and thus obtain precise information about the vehicle. This may improve efficiency and save time, since such information may be determined already before the workshop visit. It may also be possible here, advantageously, that the switchover is conditional, for example only if a transport-oriented operation for transporting an occupant is not provided or is only provided with low priority. For example, the switch may also be scheduled by the initiation, such that the switch only takes place when such conditions for the switch exist.

Furthermore, it may be possible that a (potentially also scheduled) switch from the standard operating mode to diagnosis operating mode and/or vice versa is initialized internally in the vehicle on the basis of input parameters and/or is initialized externally via a signal introduced by radio and/or cable transmission. For example, specifications may be defined, such as certain limit values for the temperature and/or a stopping duration of the vehicle. If input parameters detected by the vehicle, such as the stopping duration, exceed a certain limit, the initialization may be carried out by the vehicle itself. This ensures that transport-oriented operation is not impaired and at the same time the self-diagnosis may be carried out reliably. The advantage of this is thus that the initiation only takes place if the vehicle is not being used for other purposes, for example for transport-oriented operation. Advantageously, the vehicle may only be operated in the diagnosis operating mode dedicated to the self-diagnosis.

Furthermore, it may be provided that a switch from the standard operating mode to the diagnosis operating mode takes place (in particular only) if a non-use of the vehicle for transport is detected. This detection may preferably be enabled by occupant sensors, which detect the presence of occupants. A request and/or a planning of a transport-oriented operation may also be provided, so that in the absence of this request and/or on the basis of the planning, time periods without transport (the non-use) may be detected.

It may optionally be possible that at least one of the following steps is performed for self-diagnosis, wherein the steps are preferably performed one after the other or in any order:
  detecting at least one input parameter of the vehicle to determine a detection result,
  evaluating the detection result on the basis of a release condition to determine whether the release condition is met, in particular by comparing at least one value and/or value range for the release condition with the detection result,
  performing a diagnosis-specific activation of at least one actuator of the vehicle if the release condition is met,
  performing at least one measurement on the vehicle to determine at least one piece of diagnostic information specific to the activation, preferably during and/or after the activation, for example when a predetermined period of time is reached after the activation,
  evaluating and/or storing the diagnostic information in order to evaluate a vehicle state on the basis of the diagnostic information.

For example, the actuator may be an actuator of a cooling system, such as a pump or a valve. In this case, the measurement may be configured as a temperature measurement of a temperature behind a radiator of the vehicle. It is also conceivable that the actuator is configured as a further vehicle component (for example a drive component, a brake or the like) in order to test the associated system components. The self-diagnosis may be based on the consideration that a defined state of the vehicle normally leads to known detection results. If the detection result, for example a measured value, does not correspond to the known detection result, however, a fault may be inferred.

Furthermore, it is optionally provided that the self-diagnosis is carried out as a non-continuous diagnostic method only in the presence of at least one release condition, in particular a specific system state and/or a specific vehicle situation, wherein, preferably in the standard operating mode, in addition to the self-diagnosis, a continuous diagnostic method is carried out independently of the at least one release condition, in particular permanently. The continuous diagnostic method may differ from the non-continuous diagnostic method in such a way that the continuous diagnostic method may also be carried out continuously (in particular without entailing restrictions) in transport-oriented operation. In other words, it is not necessary to first actively induce a specific vehicle state. For example, the continuous diagnostic method may also be used to determine irregularities in the vehicle, which then initiates the diagnosis operating mode in order to carry out a more meaningful and/or more comprehensive diagnosis.

In accordance with an advantageous development of the invention, it may be provided that the self-diagnosis is carried out as an internal diagnosis of the vehicle in order to preferably determine internal fault states of at least one component and/or subsystem of the vehicle, wherein preferably a switch to the diagnosis operating mode is carried out internally by the vehicle, preferably depending on a specification for a diagnosis frequency and/or a time interval from a self-diagnosis carried out in the past and/or a result of a continuous diagnostic method.

Another subject of the invention is an automated vehicle. Here, it is provided that the vehicle has vehicle electronics which serve to provide a standard operating mode for carrying out a transport-oriented operation of the vehicle, in which a self-diagnosis with a first weighting is carried out. Furthermore, the vehicle electronics may be designed to provide a diagnosis operating mode for carrying out the self-diagnosis using a second weighting, which is greater than the first weighting. Thus, the automated vehicle according to the invention brings the same advantages as have been described in detail with respect to a method according to the invention. In addition, the automated vehicle may be capable of being operated in accordance with a method according to the invention. In particular, at least one device for data processing, such as a processor with a data memory, is provided in the automated vehicle, the device having means for carrying out the steps of a method according to the invention.

BRIEF DESCRIPTION OF THE DRAWINGS

Further advantages, features and details of the invention will become clear from the following description, in which, with reference to the drawings, exemplary embodiments of the invention are described in detail. The features mentioned in the claims and in the description may be essential to the invention individually or in any combination. In the drawings:

DETAILED DESCRIPTION OF THE INVENTION

Figure 1:
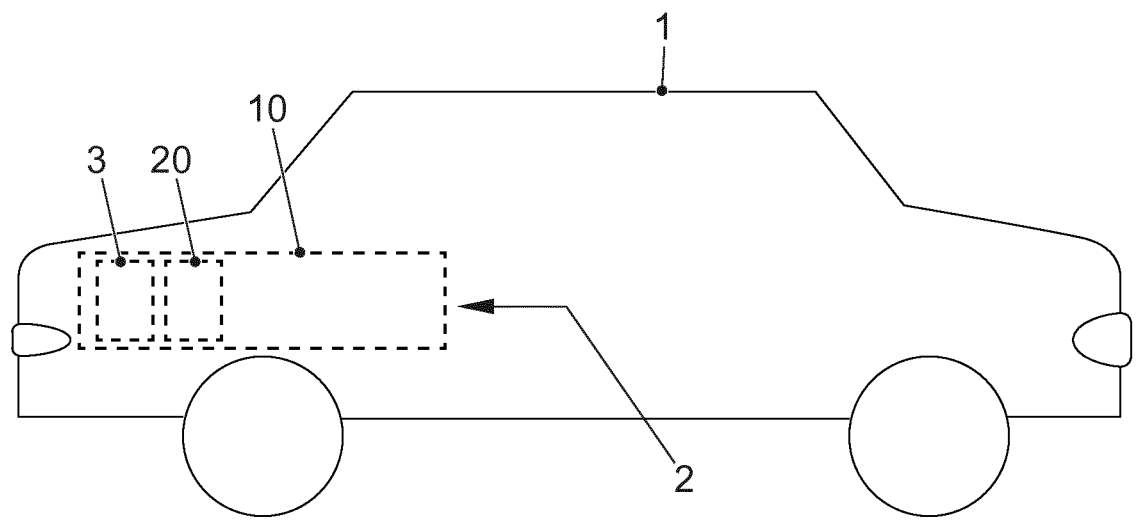
FIG. 1 shows a schematic representation of a vehicle in a side view.

FIG. 1 schematically shows a vehicle 1, which may be embodied as an automated vehicle 1 according to the invention. The vehicle 1 comprises at least one actuator 2. Furthermore, a vehicle electronics 10 is provided, which comprises, for example, a navigation system 3 and/or a control device 20. The structures mentioned may be used to carry out a self-diagnosis 115 as described in greater detail below.

Figure 2:
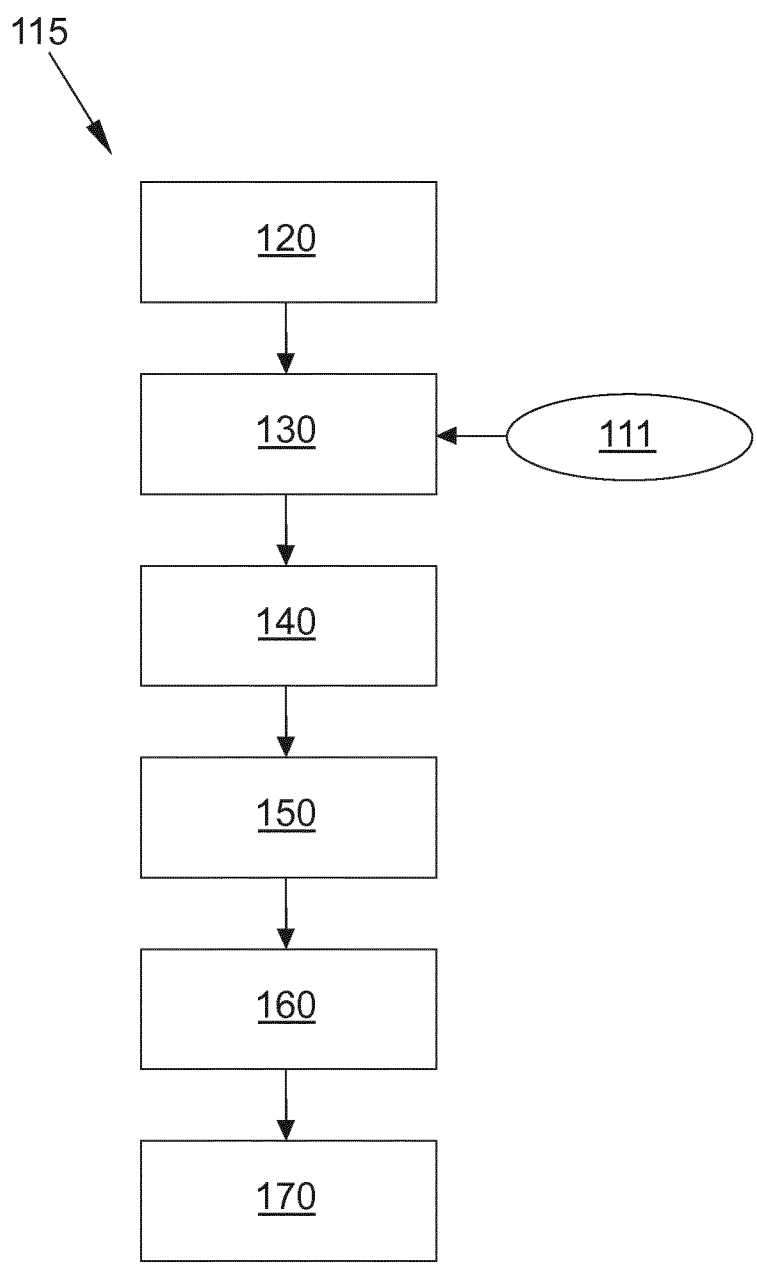
FIG. 2 shows a schematic representation for visualizing a method according to the invention.

FIG. 2 is used as an example to describe the execution of the self-diagnosis 115 in a cooling system of the vehicle 1. Of course, the method 100 according to the invention is not limited to use in a cooling system. Firstly, the self-diagnosis 115 may require that a detection 120 of a current vehicle condition be carried out. This may be compared in a first evaluation 130 with one or more release conditions 111 to determine whether a defined vehicle state exists. It is possible that, as release condition 111, a certain vehicle and/or cooling water temperature or the like must be undershot and/or the vehicle 1 must be stationary for a minimum period of time. In other words, the release condition 111 may require that vehicle 1 is transferred into a defined initial state. As soon as the release condition 111 is met, the vehicle electronics 10, in particular the control device 20, may activate at least one actuator 2 of the vehicle 1 for self-diagnosis 115. The actuator 2 is, for example, a valve of the cooling system in order to transfer the cooling system into a defined operation as a result of this activation 140. Afterwards, a measurement 150 may be performed, for example of a temperature behind the radiator. This approach is based on the knowledge that, starting from the defined vehicle state, the defined operation with proper functionality of the system of the vehicle 1 influences the vehicle 1 in such a way that at least one measured value of the measurement 150 (target value) may be predicted, which allows conclusions to be drawn about the proper functionality. In the same way, a fault may be diagnosed on the basis of a deviation of the measured value. The at least one measured value of measurement 150 forms the at least one piece of diagnostic information. It is also possible that the corresponding checking of the measured value is carried out internally in the vehicle 1 or externally on the basis of a detection of the measured value, taking into account, if necessary, a tolerance range for the target value in order to determine a faulty state. The diagnostic information may also be stored accordingly (method step 160), in order to subsequently enable a second evaluation 170 of the diagnostic information.

A further example of a self-diagnosis 115 is that the vehicle 1 must first be stationary for a certain period of time (for example at least 4 hours) according to a release condition 111. It may then be provided that (in accordance with an activation 140 of at least one actuator 2) the vehicle 1 must travel for a certain period of time and/or in a defined manner, for example for at least 20 minutes and/or at substantially 30 km/h. A measurement 150 may then be taken, for example of a temperature at the vehicle 1 or the like, to obtain diagnostic information.

Figure 3:
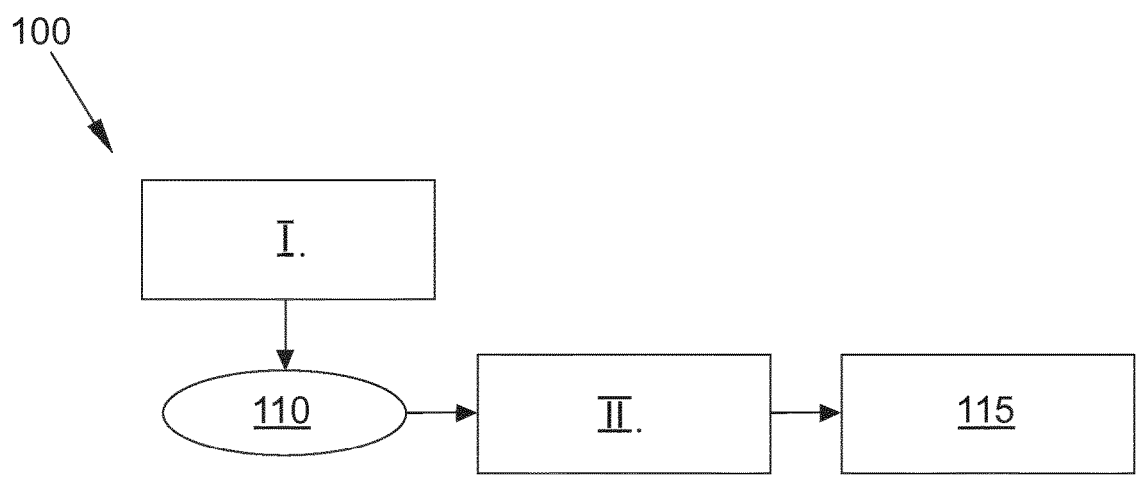
FIG. 3 shows a further schematic representation for visualizing a method according to the invention.

FIG. 3 shows that, starting from standard operating mode I, it is possible to switch 110 to the diagnosis operating mode II in order to carry out the self-diagnosis 115 with high priority. In particular, the standard operating mode I is the normal operating mode, i.e. it is predominantly activated in the vehicle 1 (for example to an extent of at least 99%). Accordingly, the diagnosis operating mode II constitutes an exceptional state, which is used, for example, before a workshop visit or the like.

The above explanation of the embodiments describes the present invention exclusively within the scope of examples. Of course, individual features of the embodiments may be freely combined with each other, if technically feasible, without departing from the scope of the present invention.

LIST OF REFERENCE SIGNS 1 vehicle, automated vehicle
2 actuator
3 navigation system
10 vehicle electronics
20 control device
100 method
110 switch
111 release condition
115 self-diagnosis
120 detection
130 initial evaluation 140 activation
150 measurement
160 storage
170 second evaluation
I standard operating mode
II diagnosis operating mode

The invention claimed is:

1. A Method for carrying out a self-diagnosis of an automated vehicle, comprising:
   operating the vehicle in a standard operating mode for a transport-oriented operation of the vehicle, in which the self-diagnosis is automatically carried out according to a first weighting, and
   operating the vehicle in a diagnosis operating mode, in which the self-diagnosis is automatically carried out using a second weighting, said second weighting being greater than the first weighting,
   wherein, in the standard operating mode, the self-diagnosis is carried out as a secondary function, and the transport-oriented operation has priority over the self-diagnosis,
   wherein, in the diagnosis operating mode, the self-diagnosis is carried out with a higher priority than in the standard operating mode,
   wherein in the diagnosis operating mode, transport-oriented operation is only performed in such a way that the self-diagnosis is possible, and
   wherein a switch from the standard operating mode to the diagnosis operating mode is actively initiated from outside the vehicle.

2. The Method according to claim 1, wherein:
   the self-diagnosis is carried out only when a predetermined system state of the vehicle is present, and
   the vehicle is operated in the standard operating mode such that the presence of the predetermined system state is passively monitored in order to initiate the self-diagnosis, and
   the vehicle is operated in the diagnosis operating mode such that the predetermined system state is actively brought about to initiate the self-diagnosis.

3. The Method according to claim 1, wherein:
   the vehicle has a navigation system for determining a route, the route being determined in the standard operating mode (I) at least predominantly on the basis of an occupant request and in the diagnosis operating mode at least predominantly on the basis of at least one release condition for the self-diagnosis, and
   the self-diagnosis always being carried out in the diagnosis operating mode and only being carried out in the standard operating mode if the release condition is present.

4. The Method according to claim 1, wherein the self-diagnosis is carried out at least as a function of a release condition for a driving behavior, the vehicle adapting the driving behavior to the self-diagnosis actively in the diagnosis operating mode, and preferably in a manner controlled within the vehicle.

5. The Method according to claim 1, wherein a switch from the standard operating mode to the diagnosis operating mode takes place if a non-use of the vehicle for transport is detected.

6. The Method according to claim 1, wherein the following sequence is carried out for self-diagnosis:
   detecting at least one input parameter of the vehicle to determine a detection result,
   evaluating the detection result on the basis of a release condition to determine whether the release condition is met,
   performing a diagnosis-specific activation of at least one actuator of the vehicle if the release condition is met,
   performing at least one measurement on the vehicle to determine at least one piece of diagnostic information specific to the activation, and
   evaluating and/or storing the diagnostic information in order to evaluate a vehicle state on the basis of the diagnostic information.

7. The Method according to claim 1, wherein the self-diagnosis is carried out as a non-continuous diagnostic method only when at least one release condition is present.

8. The Method according to claim 7, wherein the at least one release condition comprises a specific system state and/or a specific vehicle situation.

9. The Method according to claim 7, wherein a continuous diagnostic method is carried out in the standard operating mode in addition to the self-diagnosis, independently of the at least one release condition.

10. The Method according to claim 1, wherein the self-diagnosis is carried out as an internal diagnosis of the vehicle in order to determine internal fault states of at least one component and/or subsystem of the vehicle, with a switch to the diagnosis operating mode being carried out internally by the vehicle.

11. The Method according to claim 10, wherein the diagnosis operating mode is carried out internally by the vehicle depending on a specification for a diagnosis frequency and/or a time interval from a self-diagnosis carried out in the past.

12. An automated vehicle, having vehicle electronics configured to provide
   a standard operating mode for carrying out a transport-oriented operation of the vehicle, in which a self-diagnosis with a first weighting is carried out, and
   a diagnosis operating mode for carrying out the self-diagnosis using a second weighting which is greater than the first weighting,
   wherein, in the standard operating mode, the self-diagnosis is carried out as a secondary function, and the transport-oriented operation has priority over the self-diagnosis,
   wherein, in the diagnosis operating mode, the self-diagnosis is carried out with a higher priority than in the standard operating mode,
   wherein in the diagnosis operating mode, the transport-oriented operation is only performed in such a way that the self-diagnosis is possible, and
   wherein a switch from the standard operating mode to the diagnosis operating mode is actively initiated from outside the vehicle.

* * * * *